United States Patent
Shatsky et al.

(10) Patent No.: US 11,593,207 B2
(45) Date of Patent: Feb. 28, 2023

(54) STORAGE SYSTEM HAVING RAID STRIPE METADATA

(71) Applicant: EMC IP Holding Company LLC, Hopkinton, MA (US)

(72) Inventors: Yosef Shatsky, Karnei Shomron (IL); Doron Tal, Haifa (IL); Rivka Matosevich, Zichron Ya'acov (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 178 days.

(21) Appl. No.: 17/153,219

(22) Filed: Jan. 20, 2021

(65) Prior Publication Data

US 2022/0229730 A1    Jul. 21, 2022

(51) Int. Cl.
| | | |
|---|---|---|
| *G06F 11/00* | (2006.01) | |
| *G06F 11/10* | (2006.01) | |
| *G06F 11/30* | (2006.01) | |
| *G06F 11/14* | (2006.01) | |

(52) U.S. Cl.
CPC ...... *G06F 11/1096* (2013.01); *G06F 11/1092* (2013.01); *G06F 11/1435* (2013.01); *G06F 11/3034* (2013.01)

(58) Field of Classification Search
CPC ............. G06F 11/1096; G06F 11/1092; G06F 11/1435; G06F 11/3034; G06F 11/1076
USPC ....................................................... 714/1–57
See application file for complete search history.

(56) References Cited

U.S. PATENT DOCUMENTS

| | | | |
|---|---|---|---|
| 8,839,028 B1 * | 9/2014 | Polia ................... | G06F 11/1088 714/6.24 |
| 9,552,258 B2 | 1/2017 | Hallak et al. | |
| 9,990,263 B1 * | 6/2018 | Tian ..................... | G06F 11/1092 |
| 2003/0005223 A1 * | 1/2003 | Coulson ............... | G06F 12/126 711/E12.075 |
| 2003/0200478 A1 * | 10/2003 | Anderson ............... | H04L 1/22 714/E11.034 |
| 2006/0236029 A1 * | 10/2006 | Corrado .............. | G06F 11/1435 714/E11.034 |
| 2007/0143541 A1 * | 6/2007 | Nichols ............... | G06F 11/1096 714/E11.034 |
| 2010/0191907 A1 * | 7/2010 | Ish ...................... | G06F 11/1096 711/E12.001 |
| 2011/0197024 A1 * | 8/2011 | Thomas ............... | G06F 3/0689 711/E12.001 |

(Continued)

*Primary Examiner* — Sarai E Butler
(74) *Attorney, Agent, or Firm* — Ryan, Mason & Lewis, LLP

(57) ABSTRACT

A processing device obtains a write operation which comprises first data and second data to be stored in first and second strips of a given stripe. The processing device stores the first data in the first strip and determines that the second strip is unavailable. The processing device determines a parity based on the first data and the second data and stores the parity in a parity strip. The processing device updates metadata to indicate that the second data was not stored in the second strip. In some embodiments, the updated metadata is non-persistent and the processing device may be further configured to rebuild the given stripe, update persistent metadata corresponding to a sector of stripes including the given stripe and clear the non-persistent metadata based at least in part on a completion of the rebuild.

20 Claims, 12 Drawing Sheets

(56) References Cited

U.S. PATENT DOCUMENTS

| | | | |
|---|---|---|---|
| 2013/0031300 A1* | 1/2013 | Seo | G06F 11/108 |
| | | | 711/E12.008 |
| 2013/0227346 A1* | 8/2013 | Lee | G06F 11/108 |
| | | | 714/6.24 |
| 2017/0091052 A1* | 3/2017 | Gao | G06F 11/1092 |
| 2017/0270018 A1* | 9/2017 | Xiao | G06F 3/0644 |
| 2019/0073141 A1* | 3/2019 | Brennan | G06F 3/067 |
| 2019/0073162 A1* | 3/2019 | Karr | G06F 3/067 |
| 2021/0133026 A1* | 5/2021 | Horn | G06F 11/1076 |
| 2021/0397517 A1* | 12/2021 | Sharma | G06F 11/1096 |

* cited by examiner

| 4 KB | STRIP 1 | STRIP 2 | PARITY | SPARE | | DEGRADED BIT | SPARE BIT |
|---|---|---|---|---|---|---|---|
| 1 | A | A | A | - | | - | - |
| 2 | A | A | A | - | | - | - |
| 3 | A | A | A | - | | - | - |
| 4 | A | A | A | - | | - | - |

FIG. 4

| 4 KB | STRIP 1 | STRIP 2 | PARITY | SPARE |
|---|---|---|---|---|
| 1 | A | A | A | - |
| 2 | A | A | A | - |
| 3 | A | A | A | - |
| 4 | A | A | A | - |

| DEGRADED BIT | SPARE BIT |
|---|---|
| - | - |
| - | - |
| - | - |
| - | - |

FIG. 6

| 4 KB | STRIP 1 | STRIP 2 | PARITY | SPARE |
|---|---|---|---|---|
| 1 | A | A | A | - |
| 2 | B | A | B | - |
| 3 | B | A | B | - |
| 4 | A | A | A | - |

| DEGRADED BIT | SPARE BIT |
|---|---|
| - | - |
| 1 | - |
| 1 | - |
| - | - |

FIG. 7

| 4 KB | STRIP 1 | STRIP 2 | PARITY | SPARE |
|---|---|---|---|---|
| 1 | A | A | A | - |
| 2 | B | A | B | - |
| 3 | B | A | B | - |
| 4 | C | C | C | - |

| DEGRADED BIT | SPARE BIT |
|---|---|
| - | - |
| 1 | - |
| 1 | - |
| - | - |

FIG. 8

STORAGE SYSTEM HAVING RAID STRIPE METADATA

FIELD

The field relates generally to information processing systems, and more particularly to storage in information processing systems.

BACKGROUND

In many information processing systems, storage systems are key elements. Some storage systems implement a Redundant Array of Independent Disks (RAID) protection scheme for storing the data which allows the storage system to recover data in the event of a storage device failure. For example, when a storage device fails in the RAID protection scheme, a data block that was stored on the failed storage device may be recovered and rebuilt using calculations based on data blocks stored on the remaining storage devices in a corresponding row or diagonal of the corresponding stripe of the RAID protection scheme. The use of RAID protection schemes, however, faces various challenges.

SUMMARY

In some illustrative embodiments, a storage system comprises a plurality of storage devices that are configured to store data pages. The data pages are distributed across the plurality of storage devices in a plurality of data stripes. Each storage device of the plurality of storage devices stores a corresponding strip of each stripe. The storage system further comprises at least one processing device which comprises a processor coupled to memory. The at least one processing device is configured to obtain a write operation corresponding to a given stripe of the plurality of stripes. The write operation comprises first data to be stored in a first strip of the given stripe and second data to be stored in a second strip of the given stripe. The at least one processing device is further configured to determine that the second strip of the given stripe is unavailable and to store the first data in the first strip of the given stripe. The at least one processing device is further configured to determine a parity based at least in part on the first data and the second data and to store the determined parity in a parity strip corresponding to the given stripe. The at least one processing device is further configured to update metadata corresponding to the given stripe based at least in part on the storage of the first data in the first strip and the determination that the second strip is unavailable. The metadata indicates that the second data was not stored in the second strip.

In some embodiments, the metadata corresponding to the given stripe is stored as non-persistent metadata. The at least one processing device is further configured to perform a rebuild of the given stripe and to update second metadata corresponding to a sector of stripes including the given stripe based at least in part on a completion of the rebuild of the given stripe where the second metadata is stored as persistent metadata. The at least one processing device is further configured to clear the metadata corresponding to the given stripe based at least in part on the completion of the rebuild.

These and other illustrative embodiments include, without limitation, apparatus, systems, methods and processor-readable storage media.

BRIEF DESCRIPTION OF THE DRAWINGS

FIG. 4 is a diagram showing a first example scenario in an illustrative embodiment.

FIG. 6 is a diagram showing a second example scenario in an illustrative embodiment.

FIG. 7 is a diagram showing the second example scenario after a storage device has failed or gone offline with no available spare capacity in an illustrative embodiment.

FIG. 8 is a diagram showing the second example scenario after the storage device has recovered in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
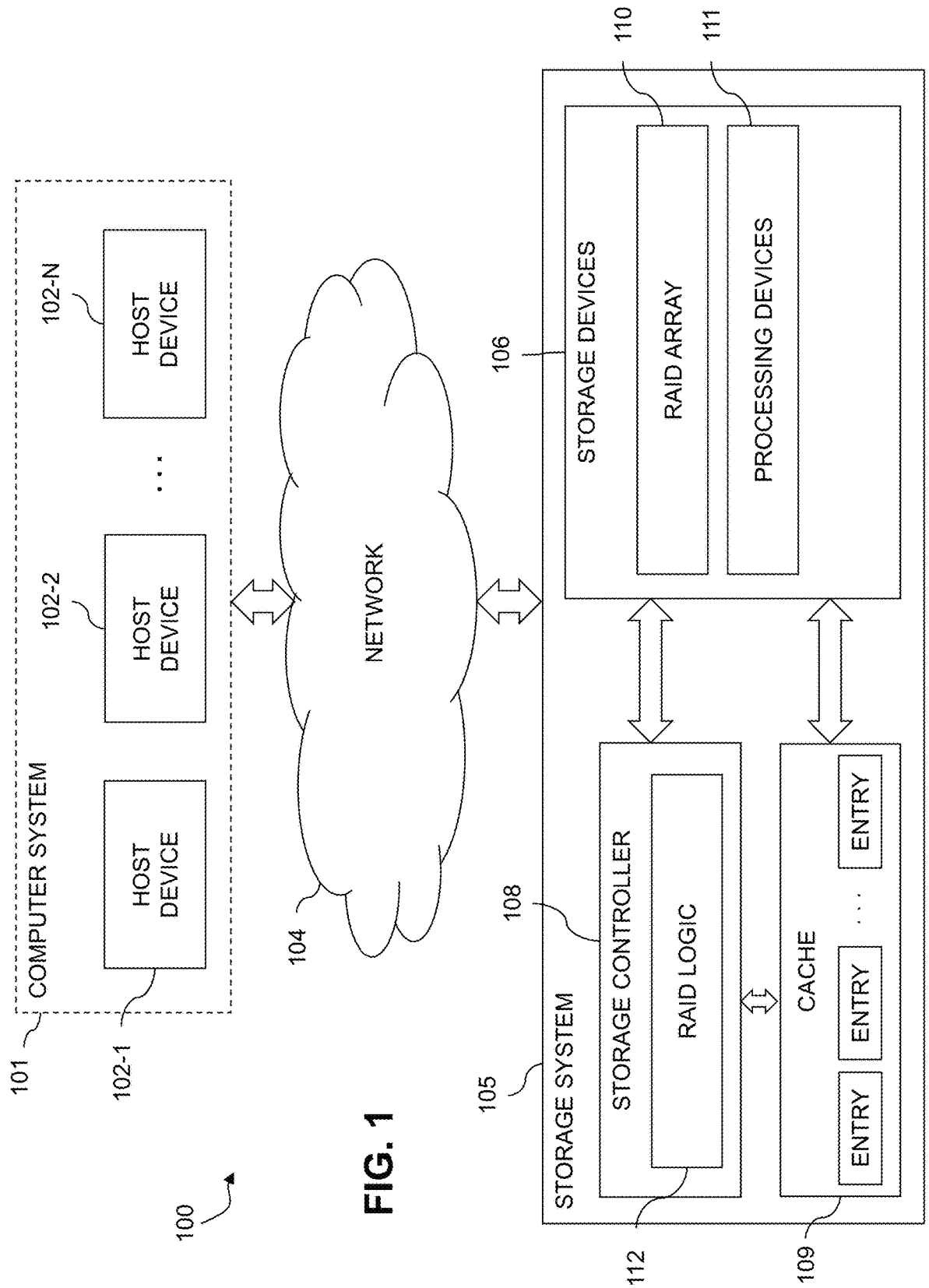
FIG. 1 is a block diagram of an example information processing system within which one or more illustrative embodiments are implemented.

FIG. 1 shows an information processing system 100 configured in accordance with an illustrative embodiment. The information processing system 100 comprises a computer system 101 that includes host devices 102-1, 102-2, . . . 102-N collectively referred to as host devices 102. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure.

The host devices 102 are configured to write data to and read data from the storage system 105. The host devices 102 and the storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106, an associated storage controller 108 and an associated cache 109.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. In some embodiments, at least some of the storage devices 106 may comprise processing devices 111 that each comprise processing resources such as, e.g., processors, memory, processing circuitry, or other similar processing resources. As an example, in some embodiments, at least some of the storage devices 106 may comprise non-volatile memory express (NVMe) or NVMe over fabric (NVMeOF) storage devices that comprise such processing resources.

It is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays, software-defined storage products, cloud storage products, object-based storage products and scale-out NAS clusters. Combinations of multiple ones of these and other storage products can also be used in implementing a given storage system in an illustrative embodiment.

In the FIG. 1 embodiment, the storage devices 106 implement a RAID array 110. The RAID array 110 is assumed to store data in stripes across a plurality of the storage devices 106. The RAID array 110 is an example of what is more generally referred to herein as data striping across a plurality of storage devices in a storage system.

The storage controller 108 comprises processing devices, memory, or other circuitry that may be utilized, for example, to service input/output (TO) operations that are received from the host devices 102 or any other operations associated with the storage system 105. While storage controller 108 may be described as comprising particular configurations herein, storage controller 108 is not limited to the disclosed embodiments and may comprise any other configuration of electrical and software components.

The cache 109 of storage system 105 includes cache entries which store incoming IO request data for later destaging to storage devices 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any nonvolatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108.

The host devices 102 and storage system 105 should also be understood to include additional modules and other components typically found in conventional implementations of computers, servers or other host devices, although such additional modules and other components are omitted from the figure for clarity and simplicity of illustration.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 12 and 13.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108, cache 109, and RAID array 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for implementing RAID metadata will be described below.

Illustrative data striping operations in accordance with RAID based techniques will now be described in further detail in the context of the information processing system 100. However, it is to be understood that data striping operations are more generally applicable to other types of information processing systems. At least some of steps are illustratively performed under the control of a storage controller 108 of storage system 105.

Data striping in some embodiments is implemented utilizing a RAID scheme, such as via RAID array 110 implemented on the storage devices 106 of the storage system 105. The storage devices of the RAID storage system may comprise SSDs or any other type of storage devices. In some embodiments, the RAID storage system may implement RAID 5 or RAID 6 with the number of data disks being k and the number of parity disks being n. In RAID 5, n is equal to one while in RAID 6, n is greater than one (e.g., n=2 for double parity). In some embodiments, the stripe column size is selected as a multiple of a designated block size.

The term RAID, as used herein, is an umbrella term for computer data storage schemes that can divide and replicate data among multiple physical disk drives. The terms disks, drives and storage devices will be used interchangeably henceforth. The physical disks are said to be in a RAID array, which is accessed by an operating system as one single disk. The different schemes or architectures are named by the word RAID followed by a number (e.g., RAID 0, RAID 1, etc.). Each scheme provides a different balance between the goals of increasing data reliability and capacity and increasing input/output performance.

The RAID 5 scheme was developed to provide functionality for recovering from a single disk failure with high utilization rates. RAID 5 uses an k+1 parity scheme, which allows failure of one disk, where k is the number of disks in the array and the 1 refers to the number of parity disks. RAID 5 defines block-level striping with single distributed parity and provides fault tolerance of one drive failure, so that the array continues to operate with in the event of a single failed drive, irrespective of which drive fails.

The RAID 6 scheme was developed to provide functionality for recovering from multiple disk failure (e.g., similar to RAID 1.3) with high utilization rates (e.g., comparable to RAID 4 and 5) that avoids system bottlenecks. RAID 6 uses an k+2 parity scheme, which allows failure of two disks, where k is the number of disks in the array. RAID 6 defines block-level striping with double distributed parity and provides fault tolerance of two drive failures, so that the array continues to operate with up to two failed drives, irrespective of which two drives fail.

There are various implementations of RAID 5 and RAID 6, which may use varying coding schemes. As the terms are used herein, RAID 5 is defined as any k+1 coding scheme which tolerates a single disk failure while RAID 6 is defined as any k+2 coding scheme which tolerates double disk failure, while user data is kept in the clear. This additional requirement assures that user reads are not affected by the RAID scheme under normal system operation. While RAID 5 and RAID 6 are defined above, any other configuration or coding scheme may alternatively be utilized.

Examples of RAID 5 schemes include those that utilize an exclusive OR (XOR) function to compute parity values from the array data which are stored on a single redundancy disk. By using the XOR function, a RAID 5 array may calculate one of the missing values for a bit, e.g., the value stored on a failed drive, given all of values of the remaining drives and the redundant drive parity value.

Examples of RAID 6 schemes include those that utilize the Reed Solomon error correction code and those that utilize parity bits, such as those wherein k data disks are supported by two redundancy disks each holding a different parity bit. It should be noted that if all parity bits are on the same two disks, then the performance may be subject to bottlenecks. This can be solved by use of distributed parity stripes over k+2 disks similar to that specified in RAID 5. Examples of coding schemes based on parity calculations of rows and diagonals in a matrix of blocks include Even/Odd and Row Diagonal Parity (RDP). Both of these schemes utilize a first parity disk "P" that holds the parities of rows of blocks as well as a second parity disk "Q" that contains blocks that hold the parity of diagonals of data blocks. In both schemes, it is advantageous to work with a block size that is smaller than the native page size. For example, the native page size may be 8 kilobytes (KB), while the block size is smaller but evenly divisible into 8 KB, e.g., 0.5 KB, 1 KB, 2 KB or 4 KB. In an example where the native page size is 8 KB and the block size is 2 KB, each stripe thus may contain four rows, and thus the four blocks present on each disk form a single native page. However, a stripe can also be defined by multiple rows of blocks distributed across the storage devices of the RAID array. It is assumed that pages are read and written using a single disk operation.

Figure 2:
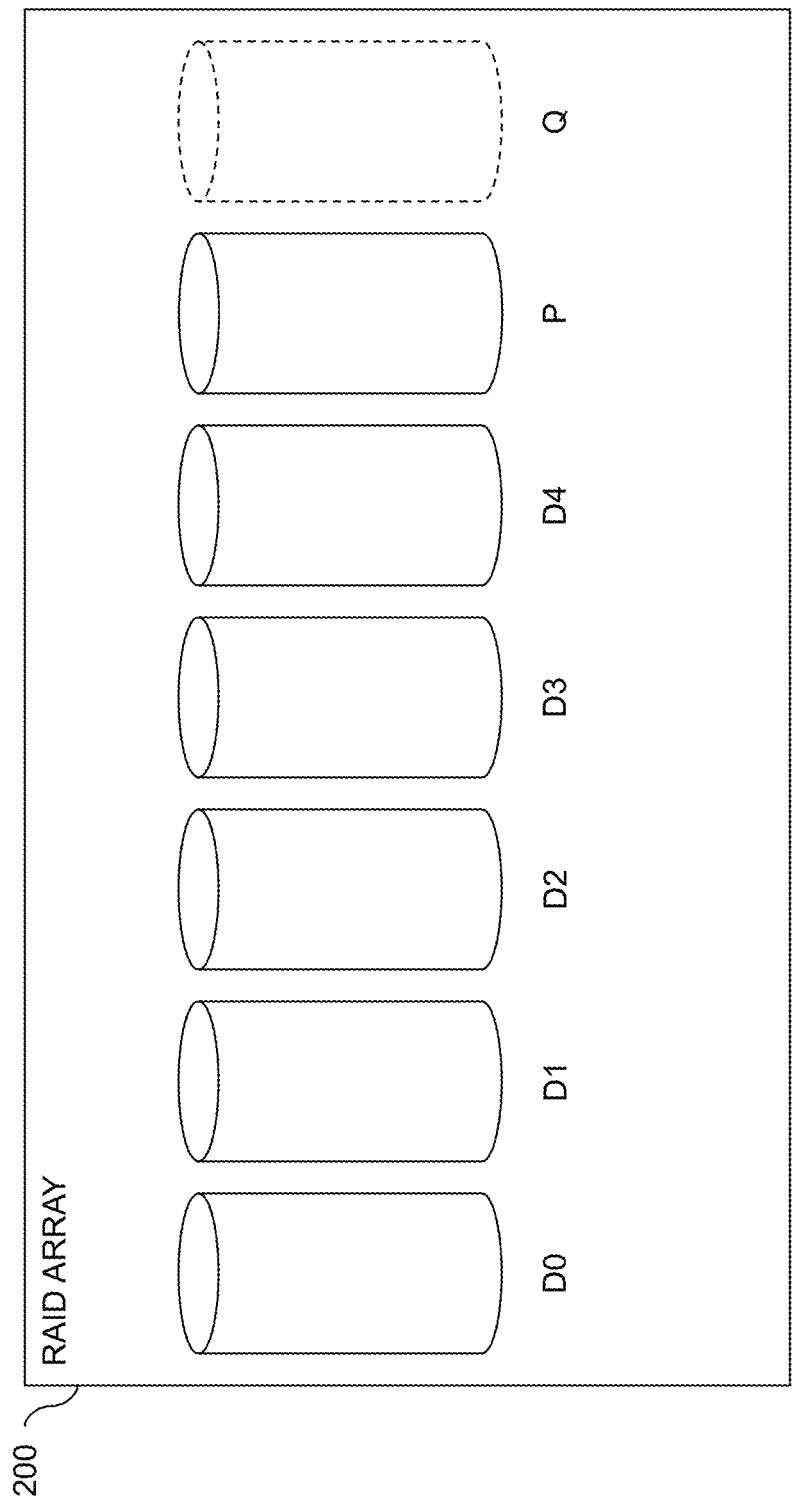
FIG. 2 is a block diagram illustrating an example of a RAID array for implementation in the FIG. 1 system.

FIG. 2 shows a RAID array 200 stored on storage devices 106, which in this example includes five data disks denoted D0 through D4. Storage controller 108 is configured for writing initial data into the array 200, and for updating existing data in the array 200. The storage controller 108 further provides functionality for recovering data after single disk failure (in the case of RAID 5 or 6) or double disk failure (in the case of RAID 6).

Each of the disks in the array 200 stores a column of data blocks, also referred to herein as a strip. The same data blocks in successive disks forms a row, which is to say the rows cross the disks. The data storage blocks are stored alongside parity data blocks in one or more parity disks denoted P (RAID 5 or 6) and Q (RAID 6), and the number of data blocks in the different columns or disks may be different. Row parity blocks are placed in a row parity column in disk P. In the case of RAID 6, the diagonal parity data is placed in diagonal parity blocks in disk Q. As shown in FIG. 2, disk Q is shown with dashed lines to indicate that disk Q is optional and is utilized in a RAID 6 scheme.

Figure 3:
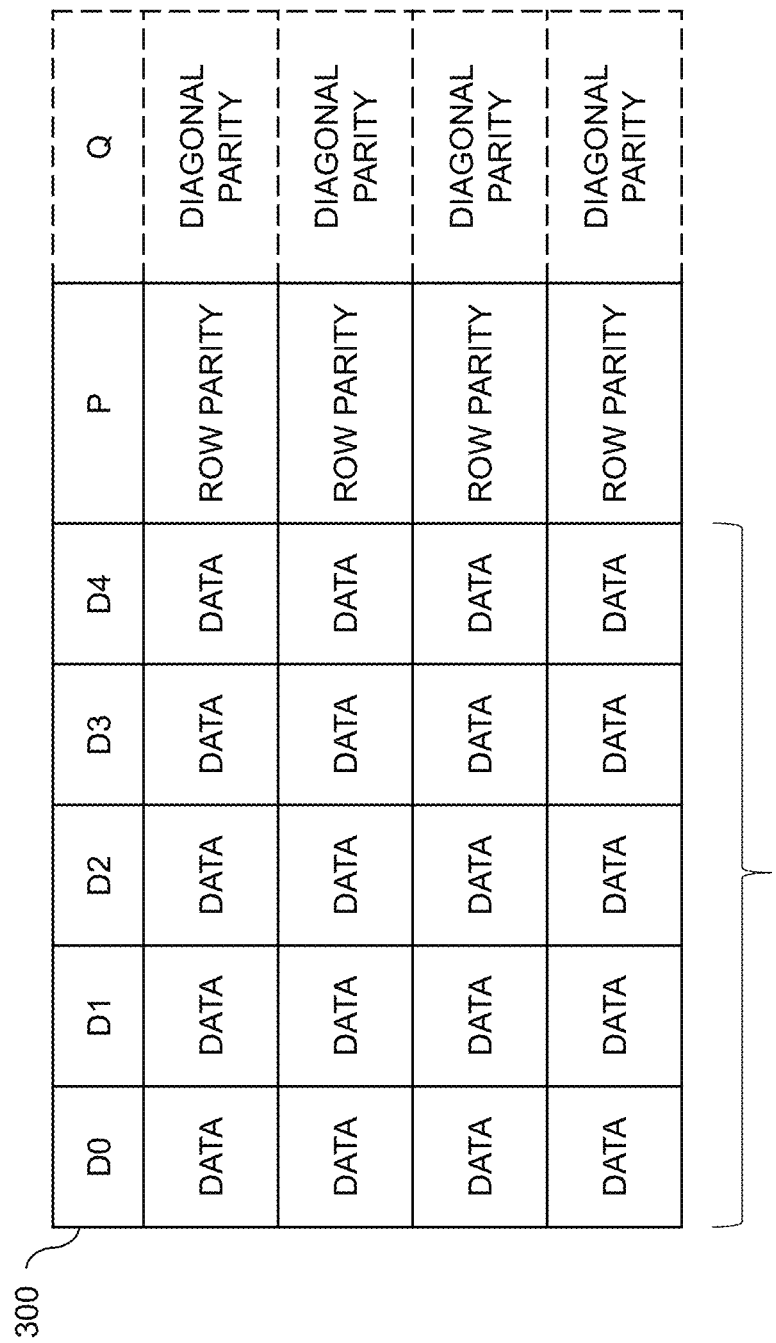
FIG. 3 is a table showing distribution of data blocks in the FIG. 2 RAID array.

FIG. 3 shows a table 300 illustrating one example distribution of data blocks in the RAID array 200. In this example, there are k data disks and there are five data columns corresponding to disks D0 through D4. There are four rows. The P column includes the same four rows as the data columns D0 through D4. In the case of RAID 6, the Q column also includes the four rows but, in some embodiments, may comprise one or more extra rows. As shown in FIG. 3, the Q column is shown with dashed lines to indicate that the Q column is optional and is utilized in a RAID 6 scheme.

In one example, each stripe is considered to contain k data columns D0 through D4, and one parity column P (RAID 5) or two parity columns P and Q (RAID 6). The stripe is composed of a quasi-matrix of blocks, which contain one or more rows, e.g., four rows in the illustrated embodiment. Column P contains a block for each row where each block provides the parity of the k data disk blocks in its row. Column Q contains a block for each diagonal where each block in disk Q holds the parity of one of the diagonals. It should be noted that the ordering of blocks within each column may be arbitrary. In some embodiments, column Q may comprise an extra block that may be placed in a data column which does not contain a data block in the diagonal of which this block is the parity. Also, some of the rows may be blank.

It should be appreciated that there are various other ways to distribute data blocks in an array such as RAID array 200. For example, in some cases it may be desired to provide more than one row parity column, which results in higher capacity overhead but which allows for a faster rebuild after a single disk failure.

Additional details regarding the above-described techniques for storing data in RAID arrays are disclosed in U.S. Pat. No. 9,552,258, entitled "Method and System for Storing Data in RAID Memory Devices," which is incorporated by reference herein.

A storage system that uses a RAID parity protection scheme such as that described above has the ability to recover from single (RAID 5) or double (RAID 6) storage device failures. In order to recover a data block that was stored on a failed storage device, the recovery calculation may require a read of the data of the corresponding row or diagonal blocks from the healthy storage devices of the corresponding stripe, e.g., the row or diagonal stripe where the data block was stored, and the performance of a bitwise exclusive or (XOR) operation on the read data.

With reference again to FIG. 3, parity RAID divides stripes into evenly sized data strips, with each strip being stored on a different storage device. For example, the data found in each row comprises a stripe of data. Each row is also divided into columns, also referred to herein as strips, where each strip corresponds to data stored on one of the storage devices, e.g., D0, D1, D2, etc. The redundancy of the RAID array is implemented by adding the one or more parity strips, each of which is stored on a different device, e.g., storage devices P (row parity—RAID 5 and 6) and Q (diagonal parity—RAID 6). When one or more storage devices fail, only one strip of a stripe is lost. The RAID array can reconstruct the lost strip using the other data strips and the parity strip or strips, as described above.

In order to ensure the integrity of the data stores on the RAID array, all strips in a stripe must be consistent. Because the parity is constructed out of all strips in a stripe, a 4 KB write that updates data in only one strip must still update the parity strip. This process may be accomplished by reading the current data in the strip, reading the data in the parity strip, writing the new data to the strip and writing the new parity to the parity strip. For a RAID 5 scheme this process may comprise two reads and two writes. For a RAID 6 scheme where two parity strips are being updated this process may comprise three reads and three writes.

In some illustrative embodiments, additional components of the RAID scheme may further complicate the consistency of a stripe. These additional components may comprise, for example, the use of one or more spare strips and the performance of degraded writes operations in the event of a failed storage device.

Spare strips may be utilized by the storage system 105 to accelerate a rebuild process in the event that a storage device of the RAID array has failed. For example, instead of waiting for the failed storage device to be replaced, the spare strip stored on a spare storage device may instead be utilized to begin a rebuild immediately. In illustrative embodiments, the use of spare strips adds additional metadata for each stripe in the RAID array which may be utilized to determine whether or not the spare strip has been utilized for any writes and which data strip the spare strip is being utilized to replace. Because rebuild is a slow process, any writes to the stripe comprising the failed strip may lead to the data corresponding to the failed strip being stored in the spare strip.

Figure 4:
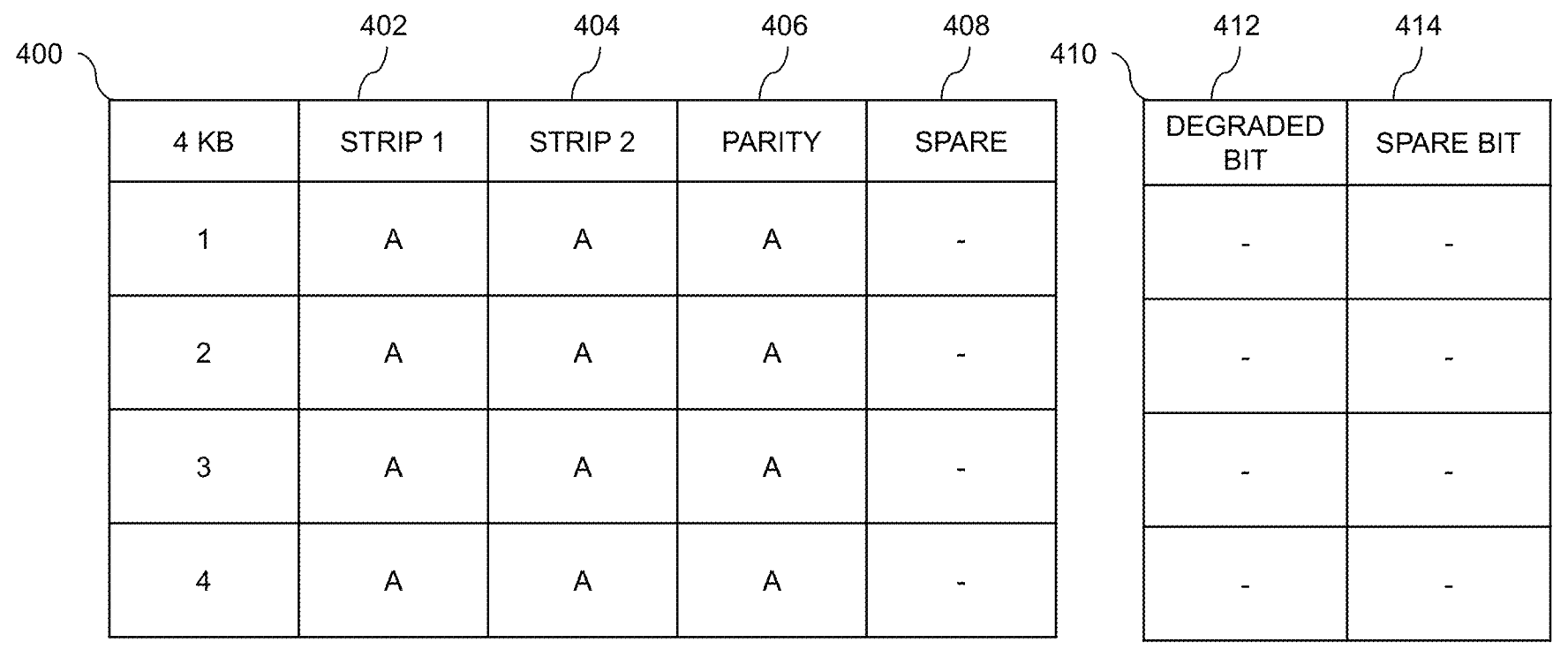
Figure 5:
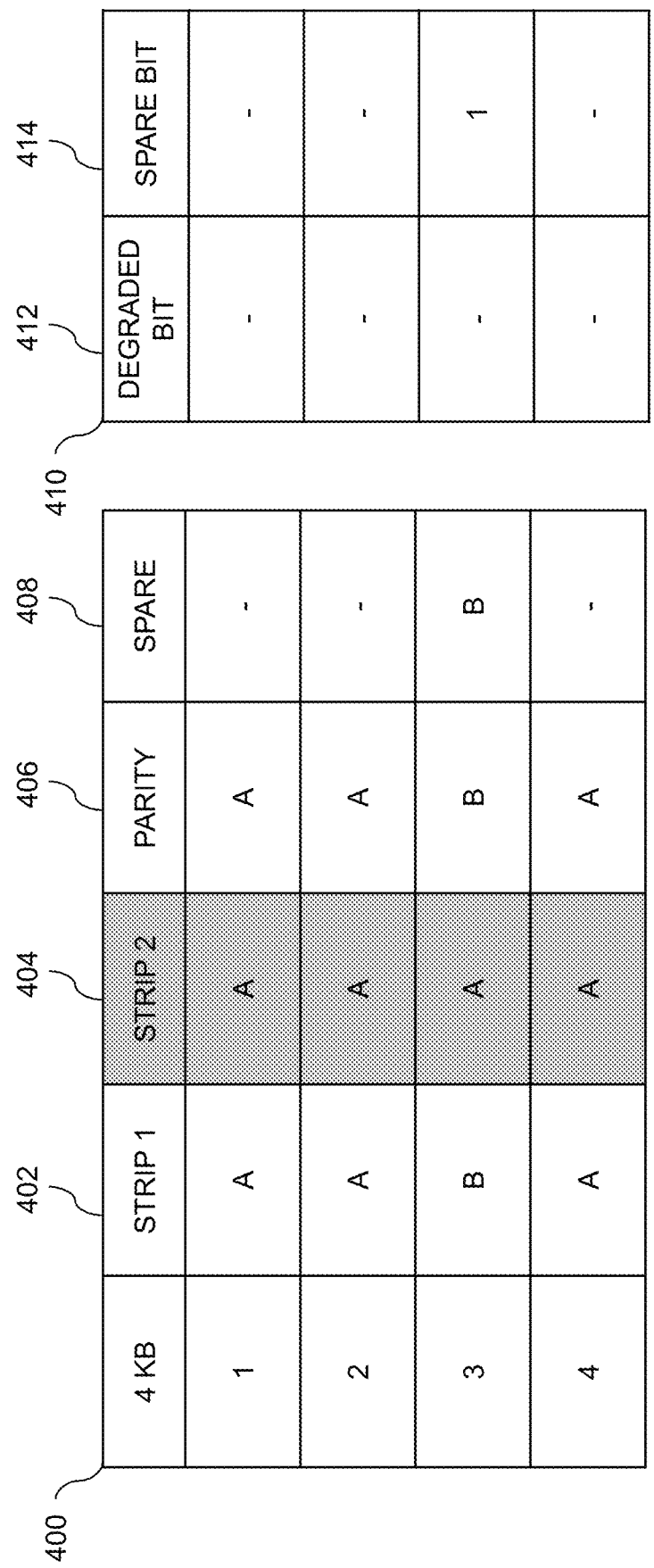
FIG. 5 is a diagram showing the first example scenario after a storage device has failed or gone offline in an illustrative embodiment.
Figure 6:
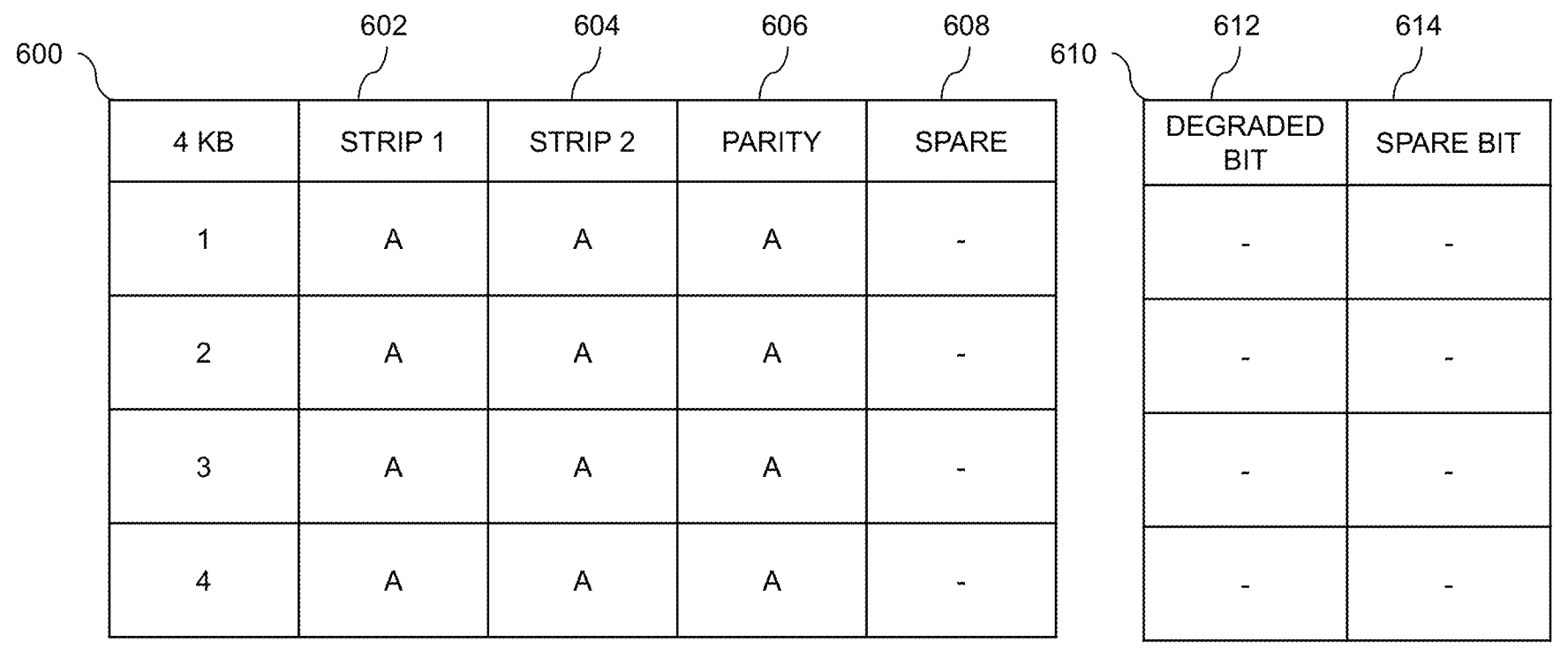
Figure 7:
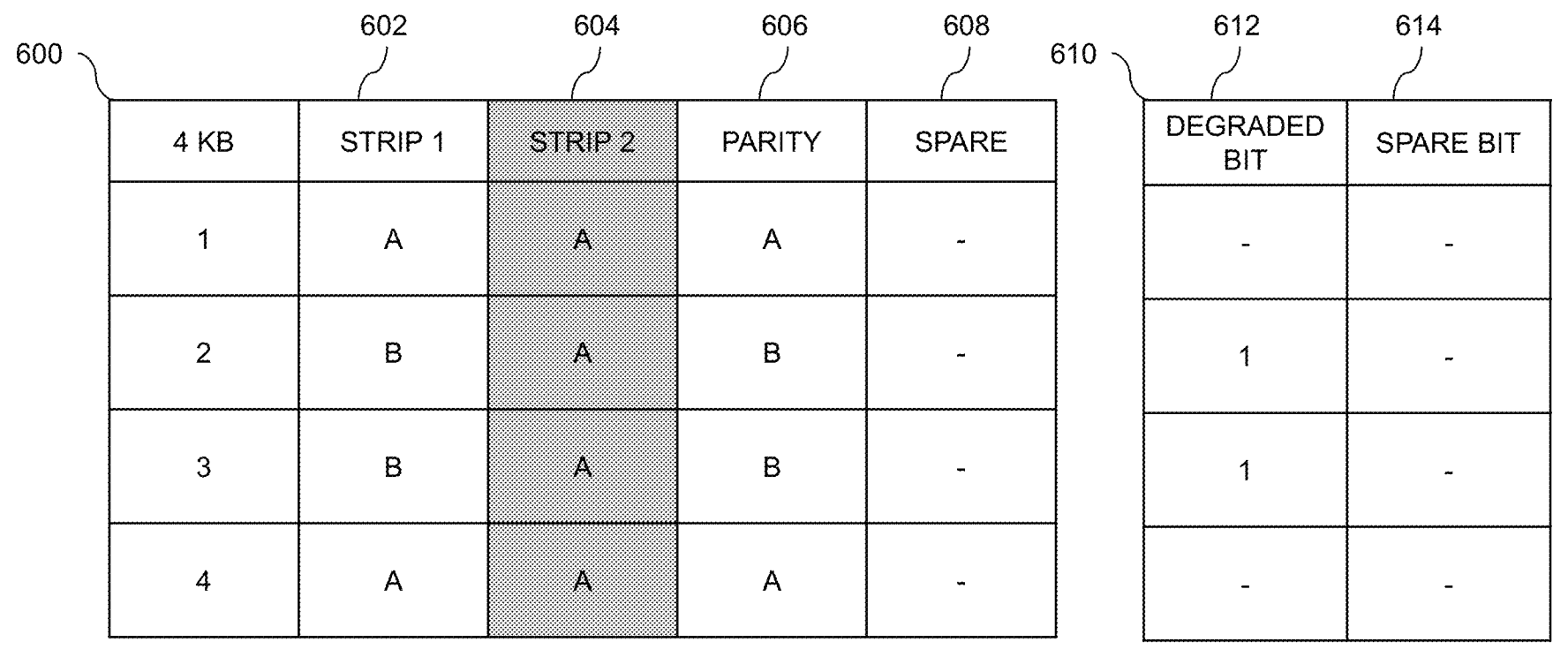

With reference now to FIGS. 4-8, two example scenarios are illustrated in which a RAID 5 (2+1) scheme is utilized. FIGS. 4 and 5 illustrate a first example scenario in which a spare strip is utilized when the storage device storing a data strip has failed or is otherwise unavailable. FIGS. 6-8 illustrate a second example scenario in which no spare strip is available and a degraded write is utilized when the storage device storing a data strip has failed or is otherwise unavailable. While the example scenarios are described with reference to a RAID 5 scheme for ease of understanding, a RAID 6 scheme may be similarly implemented through the addition of a second parity strip, e.g., a diagonal parity strip, that is stored on a second parity storage device, such as device Q shown in FIG. 3. In addition, while a single spare strip is described in the example scenarios, any other number of spare strips may be utilized to handle additional storage device failures. The first and second scenarios will now be described in more detail below.

In the first example scenario, with reference to FIGS. 4 and 5, RAID array 400 stores data in four RAID stripes, e.g., stripes 1 through 4 having 8 KB of data each, on a pair of data storage devices 402 and 404. Each row corresponds to one of the RAID stripes and comprises two strips of data, e.g., strips 1 and 2 having 4 KB of data each, with one strip stored on each of storage devices 402 and 404. For example, stripe 1 may comprise addresses 0-8 KB, stripe 2 may comprise addresses 8-16 KB and so on. Parity data for each stripe is stored in the parity strip on storage device 406. In the first example scenario, a spare strip is stored on a spare storage device 408 and is available for use.

In illustrative embodiments, RAID array 400 is associated with metadata 410. Metadata 410 comprises degraded bits 412 that indicate whether or not a degraded write has been performed for each stripe. For example, metadata 410 may comprise a bitmap of degraded bits 412 where each bit may correspond to a particular stripe or even to a particular strip of each stripe. Each of the degraded bits 412 may also be referred to individually herein as a degraded bit 412. Metadata 410 also comprises spare bits 414 that indicate whether or not a spare strip was utilized for each stripe. For example, metadata 410 may comprise a bitmap of spare bits 414 where each bit may correspond to a particular stripe or even to a particular strip of each stripe. Each of the spare bits 414 may also be referred to individually herein as a spare bit 414. While described as bits and bitmaps, any other type of metadata or data structure may be utilized to indicate whether or not a degraded write was performed for a particular stripe/strip or that a spare strip was utilized as a replacement strip for a write in a particular stripe. In a case where multiple spare strips are available, additional spare bits may be utilized for each stripe or for each strip of each stripe as needed.

In the second example scenario, with reference to FIGS. 6-8, RAID array 600 stores data in four RAID stripes, e.g., stripes 1 through 4 having 8 KB of data each, on a pair of data storage devices 602 and 604. Each row corresponds to one of the RAID stripes and comprises two strips of data, e.g., strips 1 and 2 having 4 KB of data each, with one strip stored on each of storage devices 602 and 604. For example, stripe 1 may comprise addresses 0-8 KB, stripe 2 may comprise addresses 8-16 KB and so on. Parity data for each stripe is stored in the parity strip on storage device 606. In the second example scenario, while a spare strip may be stored on a spare storage device 608, the spare strip may not be available for use at this time, e.g., due to already being utilized elsewhere. In some embodiments, no spare strip is included in the second example scenario.

In illustrative embodiments, RAID array 600 is associated with metadata 610. Metadata 610 comprises degraded bits 612 that indicate whether or not a degraded write has been performed for each stripe. For example, metadata 610 may comprise a bitmap of degraded bits 612 where each bit may correspond to a particular stripe or even to a particular strip of each stripe. Each of the degraded bits 612 may also be referred to individually herein as a degraded bit 612. Metadata 610 also comprises spare bits 614 that indicate whether or not a spare strip was utilized for each stripe. For example, metadata 610 may comprise a bitmap of spare bits 614 where each bit may correspond to a particular stripe or even to a particular strip of each stripe. Each of the spare bits 614 may also be referred to individually herein as a spare bit 614. While described as bits and bitmaps, any other type of metadata or data structure may be utilized to indicate whether or not a degraded write was performed for a particular stripe/strip or that a spare strip was utilized as a replacement strip for a write in a particular stripe. In a case where multiple spare strips are available, additional spare bits may be utilized for each stripe or for each strip of each stripe as needed.

While a single degraded bit is described above for degraded writes to a stripe where a storage device has failed in the first and second example scenarios described above, additional degraded bits may be added to support failures to more than one storage device for the stripe, e.g., in the case of a RAID 6 scheme or another RAID which may handle a failure of more than one storage device. In some embodiments, a sufficient number of degraded bits may be allocated to cover all reasonable failure cases, e.g., depending on the RAID scheme involved, including even just a single degraded bit in some cases such as, e.g., a RAID 5 scheme in which no spare capacity is allocated. In this case, when the number of failed storage devices is greater than the number of degraded bits, not including cases where a spare is utilized, the last storage device to fail may not be brought back online without a rebuild. Such a configuration provides a convenient tradeoff because data integrity is preserved, the number of bits utilized for the degraded bits is kept at a minimum and the chance of a full rebuild is relatively slim.

In some embodiments, metadata 410 or 610 may comprise an indication of which of strips 1 and 2 a spare bit 414/614 refers to, an indication of which of strips 1 and 2 a degraded bit 412/612 refers to and a functional status of all strips, e.g., alive, failed, recovered, etc. For example, in some embodiments, bitmaps may be utilized for the degraded bits 412/612 and spare bits 414/614 as described above where each bit in the bitmap corresponds to one of the strips of each stripe. In some embodiments, a separate bitmap or other data structure may also or alternatively be utilized to indicate a state or status of each strip, e.g., alive or failed, an association between the degraded bits 412/612 and a corresponding strip, an association between the spare bits 414/416 and a corresponding strip, or any other status of the strips of a given stripe.

In FIGS. 4-8, the cells comprise capital letters that indicate the point in time at which the data was written, not the actual content of the data itself. For example, in FIGS. 4-8, all of the cells marked 'A' were written before a failure of the storage device storing strip 2, e.g., storage device 404 or storage device 604. As shown in FIGS. 5, 7 and 8, all of the cells marked 'B' were written after a failure of the respective storage device storing strip 2 in each example scenario. Similarly, as shown in FIG. 8, all of the cells marked 'C' were written after the storage device storing strip 2 in the second example scenario has recovered.

References to data 'A', data 'B' and data 'C' do not indicate that the data itself is identical but instead indicate the point in time at which the data was written. For example, data written at time 'A' is referred to herein as data 'A', while data written at time 'B' is referred to herein as data B' and data written at time 'C' is referred to herein as data 'C'. Similar capital letter references for data written at other times may also be utilized. A cell with a grey background, e.g., as shown in the cells of strip 2 of FIGS. 5 and 7, indicates that the corresponding storage device for that cell, e.g., storage device 404 or 604 respectively, has failed, is offline or is otherwise unavailable for use. As can be seen from FIG. 8, strip 2 no longer has a grey background which indicates that storage device 604 is once again online and available for use although with some data which is no longer consistent.

In the first example scenario, with reference to FIG. 4, data 'A' is written to the RAID array 400 in strips 1 and 2 for all four stripes 1 through 4 and the parity is calculated for each stripe and stored in the corresponding parity strip. Next, a failure of storage device 404 occurs as indicated by the grey background in FIG. 5. After storage device 404 has failed, data 'B' is written to the storage array in stripe 3 as shown in FIG. 5. Because the spare storage device 408 is available, the data 'B' that corresponds to the failed strip 2 for stripe 3 is instead written to the corresponding portion of the spare strip for stripe 3. The state information in the metadata for stripe 3 is also updated to indicate that the data for stripe 3 is to be read from the spare strip instead of strip 2, e.g., by setting the spare bit 414 for stripe 3 that corresponds to strip 2. For example, the spare bit 414 may be set to a value of 1 in some embodiments.

In a case where there is a storage device failure and no spare strip is available, it is not possible to write to all the data strips and the parity strip. In this case an operation referred to as a degraded write is performed. In a degraded write, data is written to any strips that are stored on storage devices that have not failed, but the data corresponding to the strip stored on the storage device that has failed is not written. However, the parity is calculated based on the full write data and stored on the parity strip. Thus, the write completes without writing the data for the strip that would be stored on the failed storage device. In such a case, even though the data corresponding to the strip stored on the failed storage device is not available, the missing strip can still be read using a degraded read which rebuilds the missing strip from the strips stored on the non-failed storage devices and from the parity strip.

Degraded writes may create additional complexity. For example, if the failed storage device comes back online it now needs to know which of its strips are no longer valid due to degraded writes. In a second example scenario, shown in FIGS. 6-8, there is no spare strip available for handling writes when a storage device fails. In such a case, the degraded write described above is utilized.

As seen in FIG. 6, data 'A' was written before the failure of the storage device storing strip 2 in a similar manner to the first example scenario. Next, the storage device storing strip 2 fails and goes offline as shown by the grey background in FIG. 7. With continued reference to FIG. 7, data 'B' is then written after the storage device storing strip 2 has failed. The state information in the metadata for stripes 2 and 3 is also updated to indicate that the data for strip 2 of stripes 2 and 3 is to be read as a degraded read using the data from strip 1 and the parity strip instead of read directly from strip 2, e.g., by setting the degraded bits 612 for stripes 2 and 3 that correspond to strip 2. For example, in some embodiments the degraded bits may be set to 1. As seen in FIG. 7, strip 2 still contains data 'A' for stripes 2 and 3 because the storage device storing strip 2 was offline during the write of data 'B'. Next, with reference to FIG. 8, the storage device storing strip 2 recovers and comes back online as shown by the background for strip 2 no longer being grey. Data 'C' is then written to stripe 4. As seen in FIG. 8, data 'C' is written to both strips 1 and 2 and parity is calculated and written to the parity strip as normal and no degraded bits 614 are set in the metadata 610 for stripe 4.

When reading data from the RAID array in the second example scenario after time 'C', the data for stripes 1 and 4 is read from strips 1 and 2 as normal. However, the data for stripes 2 and 3 must be read utilizing the degraded read mentioned above to rebuild the missing data of strip 2 that was not written while strip 2 was unavailable.

In the above description, the logic for using the spare bit is as follows.

When writing to the spare strip, the corresponding spare bit is set. In some cases, where the spare strip is written to multiple times, e.g., rewrites, the spare bit may already be set. When reading from a strip that does not have an associated spare strip available, a degraded read is performed where any missing data is rebuilt utilizing the parity information stored in the corresponding parity strip and any data stored in a non-failed strip. When reading from a strip that has a corresponding spare strip, a determination is made of whether or not the corresponding spare bit is set. If the corresponding spare bit is set, e.g., as shown in stripe 3 of FIG. 5, the data is read from the spare strip instead of the corresponding data strip. If the corresponding spare bit is not set, a degraded read is performed if any of the storage devices have failed.

In the above description, the logic for using the degraded bit is as follows.

When writing to a failed strip for which there is no spare strip, the corresponding degraded bit is set. In some cases, a previous write to that failed strip may have already set the corresponding degraded bit. When attempting to read data from a strip that does not have an associated degraded bitmap, e.g., the storage device is failed or offline and no information is available that indicates a status of a failed strip, a degraded read is performed to rebuild the data of the failed strip. When reading from a strip that has an associated degraded bitmap, e.g., the storage device for a strip is online and available, a determination is made of whether or not the degraded bit corresponding to the strip is set. If the degraded bit is set for that strip, a degraded read is performed to rebuild the data of the strip even if the storage device is online and available since the strip does not have the latest data. If the degraded bit is not set for that strip, e.g., no change was made while the storage device was failed or offline, the data of the strip is read as is without performing a degraded read.

In some cases, management of the metadata comprising the degraded bits and spare bits may cause an impact to performance of the storage system 105, e.g., by utilizing additional processing resources. In order for the metadata described above to be as useful as possible in the storage system, the metadata may be both persistent and highly available, e.g., stored in more than one place. Depending on the implementation, however, the cost in write performance of updating the metadata may be significant. For example, an implementation where metadata is updated for every write to a strip or stripe may significantly degrade performance. This performance degradation may even be exacerbated when the metadata is updated more than once in multiple locations for high availability.

Figure 9:
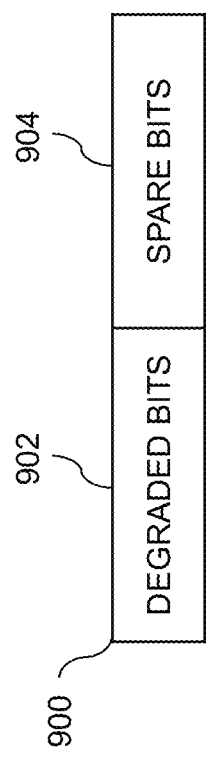
FIG. 9 illustrates example metadata of a slice in an illustrative embodiment.
Figure 10:
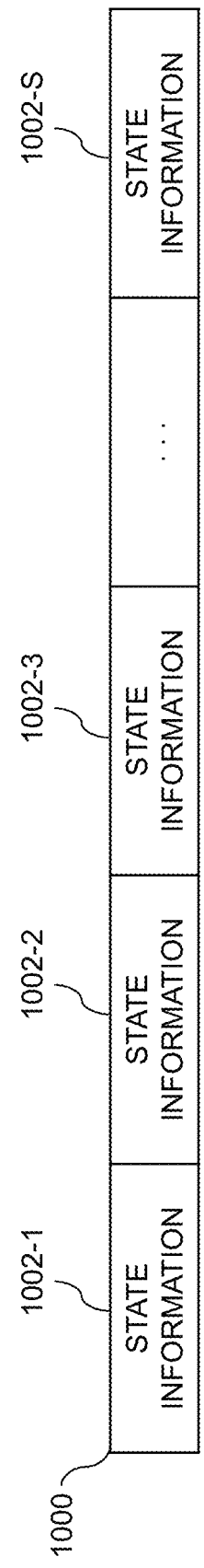
FIG. 10 illustrates example metadata of a sector in an illustrative embodiment.

In illustrative embodiments, with reference now to FIGS. 9 and 10, an example implementation is disclosed which mitigates the degraded performance by managing the metadata at two levels. The first level comprises a low granularity size for which the metadata is not persistent, e.g., a 4 KB size, 8 KB size or other KB size, also referred to herein as a slice. For example, the low granularity size may correspond to the stripe size.

The second level comprises a large granularity size for which the metadata is persistent, e.g., a 1 GB size, also referred to herein as a sector. While example sizes are provided, any other combination of sizes for the granularity of the first and second levels may be utilized. In illustrative embodiments, the first level has a granularity size that is smaller than the second level. In illustrative embodiments, a sector spans multiple stripes that are managed jointly within the sector.

The metadata 1000 for a sector may comprise a variety of state information 1002-1, 1002-2, 1002-3 . . . 1002-S, collectively and individually referred to as state information 1002. For example, the state information 1002 may comprise the identity of any spare strips and their association to any data strips that have failed. In some embodiments, the state information 1002 may comprise the status of any strips undergoing a RAID process, e.g., a RAID rebuild, where the state information 1002 may indicate whether or not the corresponding sector has begun the rebuild for those strips and whether or not the sector has completed the rebuild for those strips. In some embodiments, the state information 1002 may indicate which degraded bits correspond to which data strips.

In this implementation, none of the above-mentioned state information 1002 in the metadata 1000 for a sector is modified when the content of the sector is updated as a result of writes or a rebuild. Instead, in illustrative embodiments, the state information 1002 is updated only once the rebuild process for the sector is completed.

The information managed by the metadata 900 for each slice comprises degraded bits 902 and spare bits 904. The bits are stored separately from the state information 1002 of the metadata 1000 for the sector and are required only for specific slices. For example, degraded bits 902 are stored for slices that do not have a spare strip available and that received writes for a strip corresponding to a failed storage device. Spare bits 904 are stored for those slices that comprise spare strips and have a corresponding failed storage device. In addition, in some embodiments, the degraded bits 902 and spare bits 904 of the metadata 900 of the slices may only be allocated and utilized on a temporary basis. For example, the degraded bits 902 may only be allocated until the failed strip of a slice is assigned a spare or replacement storage device or the failed storage device returns online and the corresponding slice or sector is rebuilt. Similarly, the spare bits 904 may only be allocated while a spare strip is being utilized and may no longer be needed after the slice or sector has completed a rebuild. At the end of this transient state, the state information 1002 in the metadata 1000 for the sector is updated to remove the associations between the degraded bits 902 or spare bits 904 and any failed data strips in the persistent metadata 1000 of the sector such that the degraded bits 902 and spare bits 904 that are no longer needed may be released from the metadata 900 for the corresponding slice.

The use of separate metadata 900 containing the degraded bits 902 and spare bits 904 which is not persisted provides improved performance to the metadata 1000 of the sectors during the transient state. Without the use of the degraded bits 902 and spare bits 904, read IO operations may require a significantly larger number of degraded reads which may become very expensive in terms of computing resources. In some embodiments, even though the metadata 900 comprising the degraded bits 902 and spare bits 904 is not persistent, it still may be configured for high availability. Such high availability may have some performance cost but allows the storage system 105 to preserve the internal state of the sector metadata 1000 even in the event of a node failure. In illustrative embodiments, whether or not to implement high availability for the slice metadata 900 degraded bits 902 and spare bits 904 may be determined and configured at the time of implementation in the storage system 105.

In some cases, if the degraded bits 902 and spare bits 904 are lost either due to offline time or due to a node failure without high availability, the metadata 1000 of the sector will indicate that it has begun a rebuild process corresponding to those bits but that it is unknown how much of the rebuild process was completed. In such a case, all of the rebuild work on the sector will be restarted from the beginning and any read IO operations for the sector will perform a degraded read even though there might be correct data stored in the spare strips or in the strips on a revived storage device since the metadata stored in the degraded bits 902 and spare bits 904 has been lost and therefore the consistency status of the particular data is unknown.

The illustrative embodiments described above provide functionality that supports a variable number of spare strips where the use of each additional spare strip may increase the metadata requirements accordingly. In addition, any writes to one or more failed or offline storage devices may be monitored and tracked in metadata such that if the storage device comes online again, only the data that was written while the storage device was in the offline state would require a degraded read in the event that the corresponding data was not stored on a spare strip. In this manner, the need for degraded reads may be reduced. The slices of metadata that store corresponding degraded bits and spare bits may be utilized with or without high availability depending on the implementation requirements of the storage system and the sector level metadata is updated after all work on a sector is complete. By utilizing two levels of granularity, the performance of IO operations may be improved at the slice level while still persisting the state information at the sector level.

Figure 11:
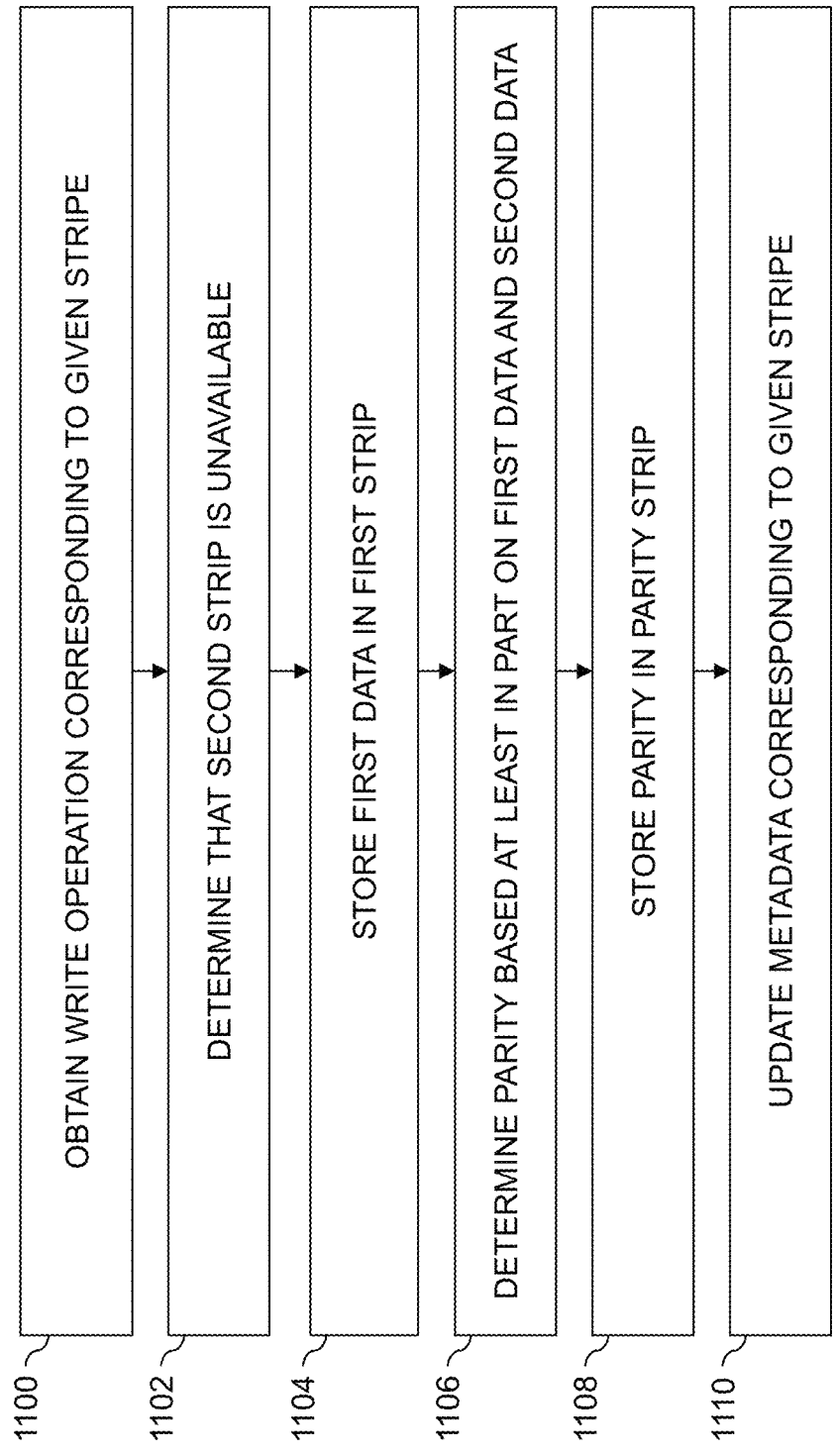
FIG. 11 is a flow diagram illustrating a process for implementing RAID metadata in an illustrative embodiment.

FIG. 11 is a flow diagram illustrating an example process for implementing RAID metadata management based on an execution of RAID logic 112 (FIG. 1) of the storage controller 108 (FIG. 1) in an illustrative embodiment.

At step 1100, RAID logic 112 obtains a write operation that corresponds to a given stripe of the plurality of stripes, e.g., from a host device 102. The write operation comprises first data to be stored in a first strip of the given stripe and second data to be stored in a second strip of the given stripe.

At step 1102, RAID logic 112 determines that the second strip of the given stripe is unavailable.

At step 1104, RAID logic 112 stores the first data in the first strip of the given stripe.

At step 1106, RAID logic 112 determines a parity based at least in part on the first data and the second data.

At step 1108, RAID logic 112 stores the determined parity in a parity strip corresponding to the given stripe At step 1110, RAID logic 112 updates the metadata corresponding to the given stripe based at least in part on the storage of the first data in the first strip and the determination that the second strip is unavailable. The metadata indicates that the second data was not stored in the second strip.

It is to be understood that for any methodologies described herein, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems or for different RAID arrays or other data striping schemes on a particular storage system or systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, the storage controller 108 or storage devices 106 that are configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The storage controller 108 or storage devices 106, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

Illustrative embodiments of host devices or storage systems with functionality implementing RAID metadata can provide a number of significant advantages relative to conventional arrangements. For example, some of the above-described embodiments provide techniques for implementing RAID metadata that reduce number of degraded read operations that need to be performed due to a failed storage device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for implementing RAID metadata will now be described in greater detail with reference to FIGS. 12 and 13. Although described in the context of system 100, these platforms may also be used to implement at least portions of other information processing systems in other embodiments.

Figure 12:
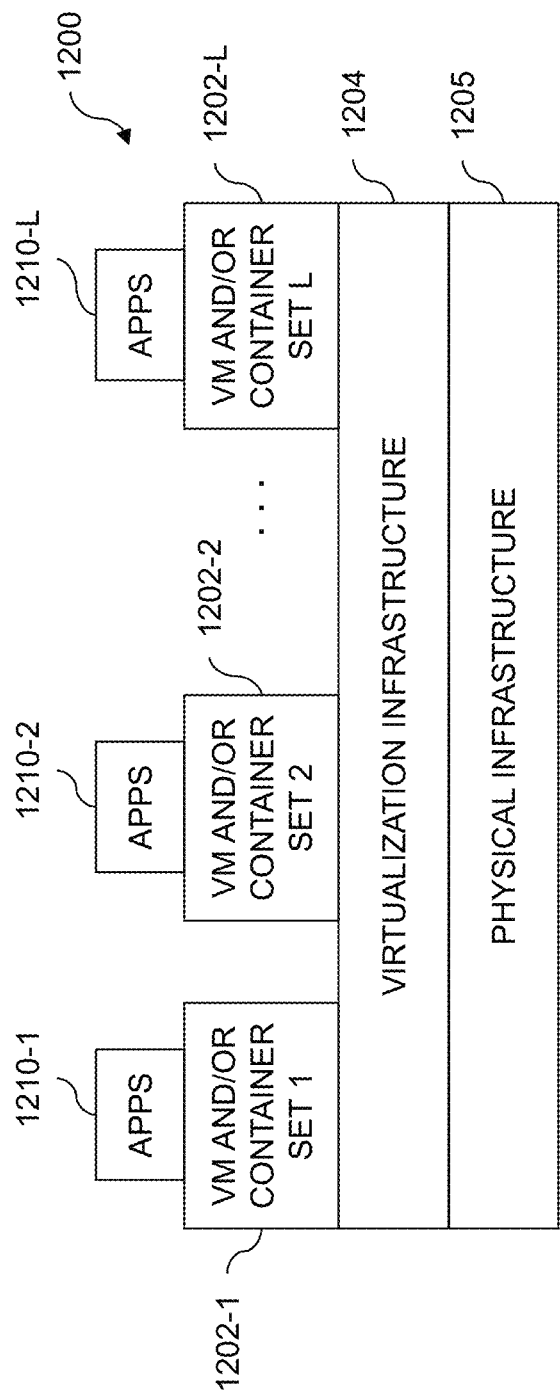
FIGS. 12 and 13 show examples of processing platforms that may be utilized to implement at least a portion of an information processing system in illustrative embodiments.
Figure 13:
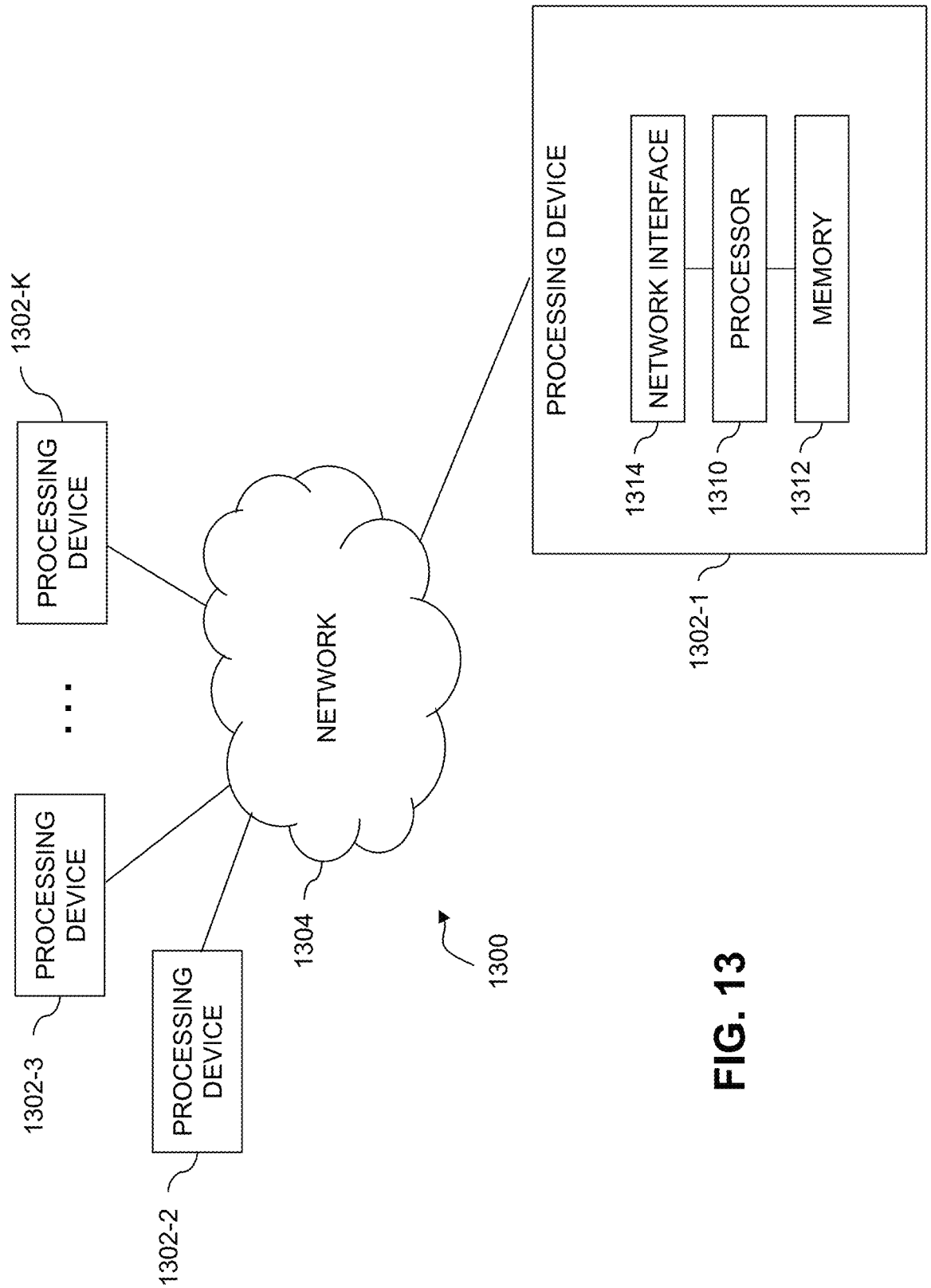

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide functionality for implementing RAID metadata of the type described above for one or more processes running on a given one of the VMs. For example, each of the VMs can implement such functionality for one or more processes running on that particular VM.

A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can provide functionality for implementing RAID metadata of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for implementing RAID metadata as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, RAID arrays or other data striping, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a storage system comprising:
        a plurality of storage devices that are configured to store data pages, the data pages being distributed across the plurality of storage devices in a plurality of data stripes, each storage device of the plurality of storage devices storing a corresponding strip of each stripe;
        at least one processing device comprising a processor coupled to memory, the at least one processing device being configured:
            to obtain a write operation corresponding to a given stripe of the plurality of data stripes, the write operation comprising first data to be stored in a first strip of the given stripe and second data to be stored in a second strip of the given stripe;
            to determine that the second strip of the given stripe is unavailable;
            to store the first data in the first strip of the given stripe;
            to determine a parity based at least in part on the first data and the second data;
            to store the determined parity in a parity strip corresponding to the given stripe; and
            to update metadata corresponding to the given stripe based at least in part on the storage of the first data in the first strip and the determination that the second strip is unavailable, the metadata indicating that the second data was not stored in the second strip;
        wherein the metadata corresponding to the given stripe comprises at least one of a degraded status indicator and a spare status indicator, with at least one of the indicators being configured to provide at least a portion of the indication that the second data was not stored in the second strip.

2. The apparatus of claim 1,
    wherein the metadata corresponding to the given stripe is stored as non-persistent metadata; and
    wherein the at least one processing device is further configured:
        to perform a rebuild of the given stripe;
        to update second metadata corresponding to a sector of stripes including the given stripe based at least in part on a completion of the rebuild of the given stripe, the second metadata being stored as persistent metadata; and to clear the metadata corresponding to the given stripe based at least in part on the completion of the rebuild of the given stripe.

3. The apparatus of claim 1,
wherein the at least one processing device is further configured to store the second data in a spare strip corresponding to the given stripe; and
wherein updating the metadata corresponding to the given stripe comprises updating the metadata to indicate that the second data is stored in the spare strip.

4. The apparatus of claim 3, the at least one processing device is further configured:
to obtain a read operation corresponding to the given stripe;
to determine based at least in part on the metadata that the spare strip comprises the second data instead of the second strip;
to read the first data from the first strip;
to read the second data from the spare strip; and
to return the first data and the second data in a response to the read operation.

5. The apparatus of claim 1, wherein updating the metadata corresponding to the given stripe comprises updating the metadata to indicate that the write operation has been performed as a degraded write operation in which the second data is not stored on the second strip of the given stripe.

6. The apparatus of claim 5, wherein the at least one processing device is further configured:
to obtain a read operation corresponding to the given stripe;
to determine based at least in part on the metadata that the second data is not stored on the second strip of the given stripe due to the degraded write operation; and
to perform a degraded read operation based at least in part on the determination that the second data is not stored on the storage devices due to the degraded write operation, the degraded read operation comprising:
reading the first data from the first strip;
reading the parity from the parity strip;
calculating the second data based at least in part on the first data and the parity; and
returning the first data and the second data in a response to the read operation.

7. The apparatus of claim 5, wherein the at least one processing device is further configured:
to obtain a second write operation corresponding to a second stripe of the plurality of data stripes, the second write operation comprising third data to be stored in a first strip of the second stripe and fourth data to be stored in a second strip of the second stripe, the first strip of the second stripe being stored on the same storage device of the plurality of storage devices as the first strip of the given stripe and the second strip of the second stripe being stored on the same storage device of the plurality of storage devices as the second strip of the given stripe;
to determine that the second strip of the second stripe is available;
to store the third data on the first strip of the second stripe; and
to store the fourth data on the second strip of the second stripe based at least in part on the determination that the second strip of the second stripe is available.

8. The apparatus of claim 7, wherein the at least one processing device is further configured:
to obtain a read operation corresponding to the given stripe and the second stripe;
to determine based at least in part on the metadata that the second data is not stored on the second strip of the given stripe due to the degraded write operation;
to perform a degraded read operation based at least in part on the determination that the second data is not stored on the second strip of the given stripe due to the degraded write operation, the degraded read operation comprising:
reading the first data from the first strip of the given stripe;
reading the parity from the parity strip of the given stripe; and
calculating the second data based at least in part on the first data and the parity;
to read the third data from the first strip of the second stripe;
to read the fourth data from the second strip of the second stripe; and
to return the first data, calculated second data, third data and fourth data in a response to the read operation.

9. A method comprising:
storing data pages on a plurality of storage devices of a storage system, the data pages being distributed across the plurality of storage devices in a plurality of data stripes, each storage device of the plurality of storage devices storing a corresponding strip of each stripe;
obtaining a write operation corresponding to a given stripe of the plurality of data stripes, the write operation comprising first data to be stored in a first strip of the given stripe and second data to be stored in a second strip of the given stripe;
determining that the second strip of the given stripe is unavailable;
storing the first data in the first strip of the given stripe;
determining a parity based at least in part on the first data and the second data;
storing the determined parity in a parity strip corresponding to the given stripe; and
updating metadata corresponding to the given stripe based at least in part on the storage of the first data in the first strip and the determination that the second strip is unavailable, the metadata indicating that the second data was not stored in the second strip;
wherein the metadata corresponding to the given stripe comprises at least one of a degraded status indicator and a spare status indicator, with at least one of the indicators being configured to provide at least a portion of the indication that the second data was not stored in the second strip; and
wherein the method is performed by at least one processing device comprising a processor coupled to memory.

10. The method of claim 9,
wherein the metadata corresponding to the given stripe is stored as non-persistent metadata; and
wherein the method further comprises:
performing a rebuild of the given stripe;
updating second metadata corresponding to a sector of stripes including the given stripe based at least in part on a completion of the rebuild of the given stripe, the second metadata being stored as persistent metadata; and
clearing the metadata corresponding to the given stripe based at least in part on the completion of the rebuild of the given stripe.

11. The method of claim 9,
wherein the method further comprises storing the second data in a spare strip corresponding to the given stripe;

wherein updating the metadata corresponding to the given stripe comprises updating the metadata to indicate that the second data is stored in the spare strip; and wherein the method further comprises:
  obtaining a read operation corresponding to the given stripe;
  determining based at least in part on the metadata that the spare strip comprises the second data instead of the second strip;
  reading the first data from the first strip;
  reading the second data from the spare strip; and
  returning the first data and the second data in a response to the read operation.

12. The method of claim 9, wherein updating the metadata corresponding to the given stripe comprises updating the metadata to indicate that the write operation has been performed as a degraded write operation in which the second data is not stored on the second strip of the given stripe.

13. The method of claim 12, wherein the method further comprises:
  obtaining a read operation corresponding to the given stripe;
  determining based at least in part on the metadata that the second data is not stored on the second strip of the given stripe due to the degraded write operation; and
  performing a degraded read operation based at least in part on the determination that the second data is not stored on the storage devices due to the degraded write operation, the degraded read operation comprising:
    reading the first data from the first strip;
    reading the parity from the parity strip;
    calculating the second data based at least in part on the first data and the parity; and
    returning the first data and the second data in a response to the read operation.

14. The method of claim 12, wherein the method further comprises:
  obtaining a second write operation corresponding to a second stripe of the plurality of data stripes, the second write operation comprising third data to be stored in a first strip of the second stripe and fourth data to be stored in a second strip of the second stripe, the first strip of the second stripe being stored on the same storage device of the plurality of storage devices as the first strip of the given stripe and the second strip of the second stripe being stored on the same storage device of the plurality of storage devices as the second strip of the given stripe;
  determining that the second strip of the second stripe is available;
  storing the third data on the first strip of the second stripe; and
  storing the fourth data on the second strip of the second stripe based at least in part on the determination that the second strip of the second stripe is available.

15. The method of claim 14, wherein the method further comprises:
  obtaining a read operation corresponding to the given stripe and the second stripe;
  determining based at least in part on the metadata that the second data is not stored on the second strip of the given stripe due to the degraded write operation;
  performing a degraded read operation based at least in part on the determination that the second data is not stored on the second strip of the given stripe due to the degraded write operation, the degraded read operation comprising:
    reading the first data from the first strip of the given stripe;
    reading the parity from the parity strip of the given stripe; and
    calculating the second data based at least in part on the first data and the parity;
  reading the third data from the first strip of the second stripe;
  reading the fourth data from the second strip of the second stripe; and
  returning the first data, calculated second data, third data and fourth data in a response to the read operation.

16. A computer program product comprising a non-transitory processor-readable storage medium having stored therein program code of one or more software programs, the program code being executable by at least one processing device of a storage system, the at least one processing device comprising a processor coupled to memory, the storage system comprising a plurality of storage devices that are configured to store data pages, the data pages being distributed across the plurality of storage devices in a plurality of data stripes, each storage device of the plurality of storage devices storing a corresponding strip of each stripe, wherein the program code, when executed by the at least one processing device, causes the at least one processing device:
  to obtain a write operation corresponding to a given stripe of the plurality of data stripes, the write operation comprising first data to be stored in a first strip of the given stripe and second data to be stored in a second strip of the given stripe;
  to determine that the second strip of the given stripe is unavailable;
  to store the first data in the first strip of the given stripe;
  to determine a parity based at least in part on the first data and the second data;
  to store the determined parity in a parity strip corresponding to the given stripe; and
  to update metadata corresponding to the given stripe based at least in part on the storage of the first data in the first strip and the determination that the second strip is unavailable, the metadata indicating that the second data was not stored in the second strip;
  wherein the metadata corresponding to the given stripe comprises at least one of a degraded status indicator and a spare status indicator, with at least one of the indicators being configured to provide at least a portion of the indication that the second data was not stored in the second strip.

17. The computer program product of claim 16,
  wherein the metadata corresponding to the given stripe is stored as non-persistent metadata; and
  wherein the program code causes the at least one processing device:
    to perform a rebuild of the given stripe;
    to update second metadata corresponding to a sector of stripes including the given stripe based at least in part on a completion of the rebuild of the given stripe, the second metadata being stored as persistent metadata; and
    to clear the metadata corresponding to the given stripe based at least in part on the completion of the rebuild of the given stripe.

18. The computer program product of claim 16, wherein:
  the program code causes the at least one processing device to store the second data in a spare strip corresponding to the given stripe;

updating the metadata corresponding to the given stripe comprises updating the metadata to indicate that the second data is stored in the spare strip; and the program code further causes the at least one processing device:
- to obtain a read operation corresponding to the given stripe;
- to determine based at least in part on the metadata that the spare strip comprises the second data instead of the second strip;
- to read the first data from the first strip;
- to read the second data from the spare strip; and
- to return the first data and the second data in a response to the read operation.

19. The computer program product of claim 16, wherein:

updating the metadata corresponding to the given stripe comprises updating the metadata to indicate that the write operation has been performed as a degraded write operation in which the second data is not stored on the second strip of the given stripe;

the program code further causes the at least one processing device:
- to obtain a read operation corresponding to the given stripe;
- to determine based at least in part on the metadata that the second data is not stored on the second strip of the given stripe due to the degraded write operation; and
- to perform a degraded read operation based at least in part on the determination that the second data is not stored on the storage devices due to the degraded write operation, the degraded read operation comprising:
  - reading the first data from the first strip;
  - reading the parity from the parity strip;
  - calculating the second data based at least in part on the first data and the parity; and
  - returning the first data and the second data in a response to the read operation.

20. The computer program product of claim 16, wherein:

updating the metadata corresponding to the given stripe comprises updating the metadata to indicate that the write operation has been performed as a degraded write operation in which the second data is not stored on the second strip of the given stripe;

the program code further causes the at least one processing device:
- to obtain a second write operation corresponding to a second stripe of the plurality of data stripes, the second write operation comprising third data to be stored in a first strip of the second stripe and fourth data to be stored in a second strip of the second stripe, the first strip of the second stripe being stored on the same storage device of the plurality of storage devices as the first strip of the given stripe and the second strip of the second stripe being stored on the same storage device of the plurality of storage devices as the second strip of the given stripe;
- to determine that the second strip of the second stripe is available;
- to store the third data on the first strip of the second stripe;
- to store the fourth data on the second strip of the second stripe based at least in part on the determination that the second strip of the second stripe is available;
- to obtain a read operation corresponding to the given stripe and the second stripe;
- to determine based at least in part on the metadata that the second data is not stored on the second strip of the given stripe due to the degraded write operation;
- to perform a degraded read operation based at least in part on the determination that the second data is not stored on the second strip of the given stripe due to the degraded write operation, the degraded read operation comprising:
  - reading the first data from the first strip of the given stripe;
  - reading the parity from the parity strip of the given stripe; and
  - calculating the second data based at least in part on the first data and the parity;
- to read the third data from the first strip of the second stripe;
- to read the fourth data from the second strip of the second stripe; and
- to return the first data, calculated second data, third data and fourth data in a response to the read operation.

* * * * *